(12) United States Patent
Kang et al.

(10) Patent No.: US 9,727,146 B2
(45) Date of Patent: Aug. 8, 2017

(54) PORTABLE TERMINAL HAVING COVER DEVICE (71) Applicant: Samsung Electronics Co., Ltd., Gyeonggi-do (KR)

(72) Inventors: Seong-Woon Kang, Gyeonggi-do (KR); Young-Woong Kim, Seoul (KR); Sung-Jin Park, Seoul (KR); Kyu-Suk Lee, Gyeonggi-do (KR); Jong-In Lee, Gyeonggi-do (KR); Kyung-Hoon Cha, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/257,405

(22) Filed: Apr. 21, 2014

(65) Prior Publication Data
US 2014/0333552 A1 Nov. 13, 2014

(30) Foreign Application Priority Data

May 13, 2013 (KR) ........................ 10-2013-0053604

(51) Int. Cl.
G06F 3/03 (2006.01)
G06F 3/16 (2006.01)
G06F 3/041 (2006.01)
G06F 1/16 (2006.01)
H04M 1/725 (2006.01)
H04M 1/18 (2006.01)
G06F 1/32 (2006.01)

(52) U.S. Cl.
CPC ............. *G06F 3/03* (2013.01); *G06F 1/1626* (2013.01); *G06F 1/1628* (2013.01); *G06F 1/1647* (2013.01); *G06F 1/1684* (2013.01); *H04M 1/72527* (2013.01); *G06F 1/3262* (2013.01); *G06F 2200/1632* (2013.01); (Continued)

(58) Field of Classification Search
CPC ................ G06F 1/1626; G06F 1/1647; G06F 2200/1632; G06F 2200/1634; G06F 1/169; G06F 3/0416; G06F 3/041; G06F 3/044; G06F 3/046; G06F 1/1643; G06F 1/1684; G06F 1/1698; G06F 3/04883; G06F 1/1628; G06F 1/1641; G06F 1/3262; G06F 3/03545; G06F 3/0488; G06F 1/1616;
(Continued)

(56) References Cited

U.S. PATENT DOCUMENTS 6,144,358 A * 11/2000 Narayanaswamy et al. . 345/102
6,473,076 B1 * 10/2002 Thompson et al. .......... 345/179
(Continued)

FOREIGN PATENT DOCUMENTS

EP 2 059 005 5/2009
EP 2 546 729 1/2013
WO WO 02/44878 6/2002

OTHER PUBLICATIONS

European Search Report dated Feb. 5, 2016 issued in counterpart application No. 14168080.1-1959, 6 pages.

*Primary Examiner* — Hong Zhou
(74) *Attorney, Agent, or Firm* — The Farrell Law Firm, P.C.

(57) ABSTRACT

A portable terminal provided with a cover is provided. The portable terminal includes a main body including an input/output unit; a cover attachable to and detachable from the main body, and provided with an output unit; a first sensor that detects folding/unfolding of the cover; and a controller that controls an output of the input/output unit or the output unit according to a detection signal of the first sensor.

8 Claims, 10 Drawing Sheets (52) U.S. Cl.
CPC ..... *G06F 2200/1634* (2013.01); *H04M 1/185* (2013.01); *H04M 2250/16* (2013.01); *H04M 2250/22* (2013.01)

(58) Field of Classification Search
CPC . G06F 3/03; H04M 2250/16; H04M 2250/22; H04M 1/185; H04M 1/72527
USPC ............ 345/168–179; 178/18.01–19.03
See application file for complete search history.

(56) References Cited

U.S. PATENT DOCUMENTS

| | | | |
|---|---|---|---|
| 6,573,886 B1* | 6/2003 | Lehtinen et al. | 345/173 |
| 7,289,083 B1* | 10/2007 | Canova, Jr. | G06F 1/1622 345/1.1 |
| 7,688,315 B1 | 3/2010 | Gettemy et al. | |
| 2005/0166076 A1 | 7/2005 | Truong | |
| 2007/0139394 A1* | 6/2007 | Weng | 345/173 |
| 2007/0273673 A1* | 11/2007 | Park et al. | 345/179 |
| 2008/0074400 A1* | 3/2008 | Gettemy et al. | 345/173 |
| 2008/0227505 A1* | 9/2008 | Jang et al. | 455/575.1 |
| 2009/0052654 A1* | 2/2009 | Hyun et al. | 379/433.11 |
| 2010/0110021 A1* | 5/2010 | Chiu et al. | 345/173 |
| 2010/0177036 A1* | 7/2010 | Nam | 345/156 |
| 2010/0220062 A1* | 9/2010 | Antila | 345/173 |
| 2011/0117971 A1* | 5/2011 | Kim | G06F 1/1647 455/566 |
| 2012/0072167 A1* | 3/2012 | Cretella, Jr. | G06F 1/1626 702/150 |
| 2012/0194448 A1 | 8/2012 | Rothkopf | |
| 2013/0217444 A1* | 8/2013 | Lee et al. | 455/566 |
| 2013/0300679 A1* | 11/2013 | Oh et al. | 345/173 |

* cited by examiner

PORTABLE TERMINAL HAVING COVER DEVICE

PRIORITY

This application claims priority under 35 U.S.C. §119(a) to Korean Patent Application Serial No. 10-2013-0053604, which was filed in the Korean Intellectual Property Office on May 13, 2013, the entire content of which is incorporated herein by reference.

BACKGROUND

1. Field of the Invention

The present invention relates generally to a portable terminal, and more particularly, to a portable terminal having a cover device.

2. Description of the Related Art

In recent years, various electronic devices have been developed for users, and these devices (hereinafter, "portable terminals"), through which users can access various types of content while carrying them, have been widely used and include mobile terminals, MP3 players, Portable Multimedia Players (PMP), e-books, and the like. Various functions such as the ability to shoot photos or record moving images, music videos, multimedia, and game functions, as well as a wireless transmission/reception function, are being integrated into the portable terminals. The portable terminals are provided with, on a front surface thereof, a touch screen capable of using multi-functions, and smart phones are now provided on an entire front surface thereof with a touch screen responding to a touch.

However, an external case of the portable terminals or the exposed touch screen on the front surface of the portable terminals may be damaged due to scratches or an impact while the portable terminals are being carried or used. To prevent the damage, the portable terminals are provided with various cases or covers (hereinafter, "cover device"). The existing cover devices covering the portable terminal typically have a form in which the touch screen is not covered and, for example, only the external rim or the rear case of the portable terminal is covered, or a form in which the entire portable terminal is covered with a flip type case so that a portion covering the touch screen is opened and closed for use of the touch screen.

In the case of a cover device which exposes the touch screen to the outside, it is difficult to prevent scratches or damage of the touch screen. In the case of a flip-type cover device, a user must open the cover covering the touch screen whenever using the touch screen. In addition, the flip-type cover device causes inconvenience when opening the cover even in the case of a simple incoming or outgoing call. Further, for the flip-type cover device, the user must open the cover for use of a display device whenever using the portable terminal, and therefore, the flip device can be damaged due to frequent opening/closing of the cover. Furthermore, both the cover device covering only the outside portion of the portable terminal and the flip-type cover device are prone to damage such as scratches since the touch screen must be exposed to the outside and contact for a touch is made for usage of the touch screen.

SUMMARY

The present invention has been made to address at least the above problems and disadvantages, and to provide at least the advantages described below.

Accordingly, an aspect of the present invention is to provide a portable terminal having a cover device, which can implement an output of preset contents even while a touch screen is covered with the cover device.

Another aspect of the present invention is to provide a portable terminal having a cover device, which can output an output value of an input device on a front surface of the cover device when the input device is detected to be used while a touch screen is covered with the cover device.

In accordance with an aspect of the present invention, a portable terminal having a cover device is provided. The portable terminal includes a main body comprising an input/output unit; a cover attachable to and detachable from the main body, and provided with an output unit; a first sensor that detects folding/unfolding of the cover; and a controller that controls an output of the input/output unit or the output unit according to a detection signal of the first sensor.

In accordance with another aspect of the present invention, a portable terminal having a cover device is provided. The portable terminal includes a main body; a touch screen provided on the main body and comprising a touch panel and a display panel that implement an input and an output; an input member provided to the main body, and implementing an input to the touch screen; a cover attachable to and detachable from the main body, covering the touch screen, and provided on a front surface thereof with an output unit; a first sensor that detects folding/unfolding of the cover; a second sensor that detects whether the input member is removed from the main body; and a controller that controls an output of the touch screen or the output unit according to first signal detection of the first sensor, and controls activation of the touch panel according to second signal detection of the second sensor while the first sensor detects the first signal.

In accordance with another aspect of the present invention, a portable terminal having a cover device is provided. The portable terminal includes a touch screen comprising a touch panel that implements an input and an output; and a cover that opens/closes the touch screen and is provided with an output unit, wherein the touch screen or the output unit implements an output according to whether the cover is folded toward the touch screen, and an output to the output unit is implemented according to detection of the touch panel as the touch panel is activated.

In accordance with another aspect of the present invention, a cover device for a portable terminal is provided. The cover device includes a front cover for covering a front surface of the portable terminal; a rear cover detachably mounted to a rear surface of the portable terminal, and comprising a connector for electrically connect the cover device to the portable terminal; and a connecting member connecting the front cover and the rear cover, wherein the front cover is provided with an output unit on a front surface of the front cover to output content when the front cover covers the front surface of the portable terminal.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Hereinafter, various embodiments of the present invention will be described with reference to the accompanying drawings. In the description, a thickness of lines or a size of structural elements in the drawings may be exaggerated for convenience and definition of description. Further, terms to be described herein are defined in consideration of functions in various embodiments of the present invention, and may be changed according to a user, an intention of an operator, or convention. Therefore, the definitions of the terms should be determined based on contents throughout the specification.

Furthermore, in the description of the embodiments of the present invention, ordinal numbers such as "first" and "second" are used, but are to merely distinguish objects having the same name from one another. Orders thereof may be arbitrarily determined and the description of a preceding object will be applied to a following object. In the description of the embodiments of the present invention, in addition, the terms are used to describe the respective embodiments, and are not intended to limit the embodiments. A singular expression may include a plural expression unless they are definitely different in a context. In the description, it should be understood that the terms "include" or "have" indicate existence of a feature, a number, a step, an operation, a structural element, parts, or a combination thereof, and do not previously exclude the existence or probability of addition of one or more other features, numbers, steps, operations, structural elements, parts, or combinations thereof.

Figure 1A:
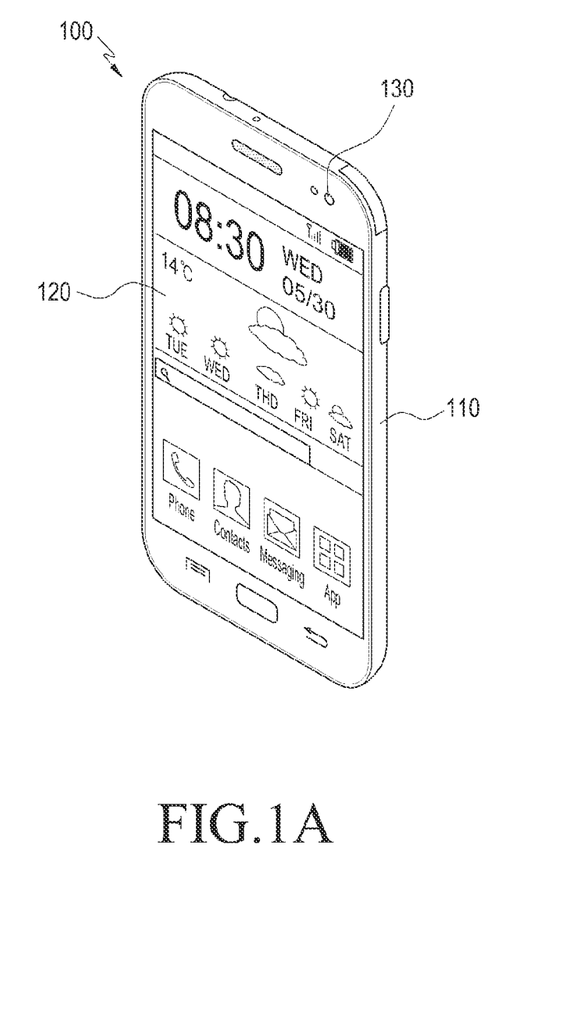
FIGS. 1A and 1B are perspective views schematically illustrating a portable terminal according to embodiments of the present invention.
Figure 1B:
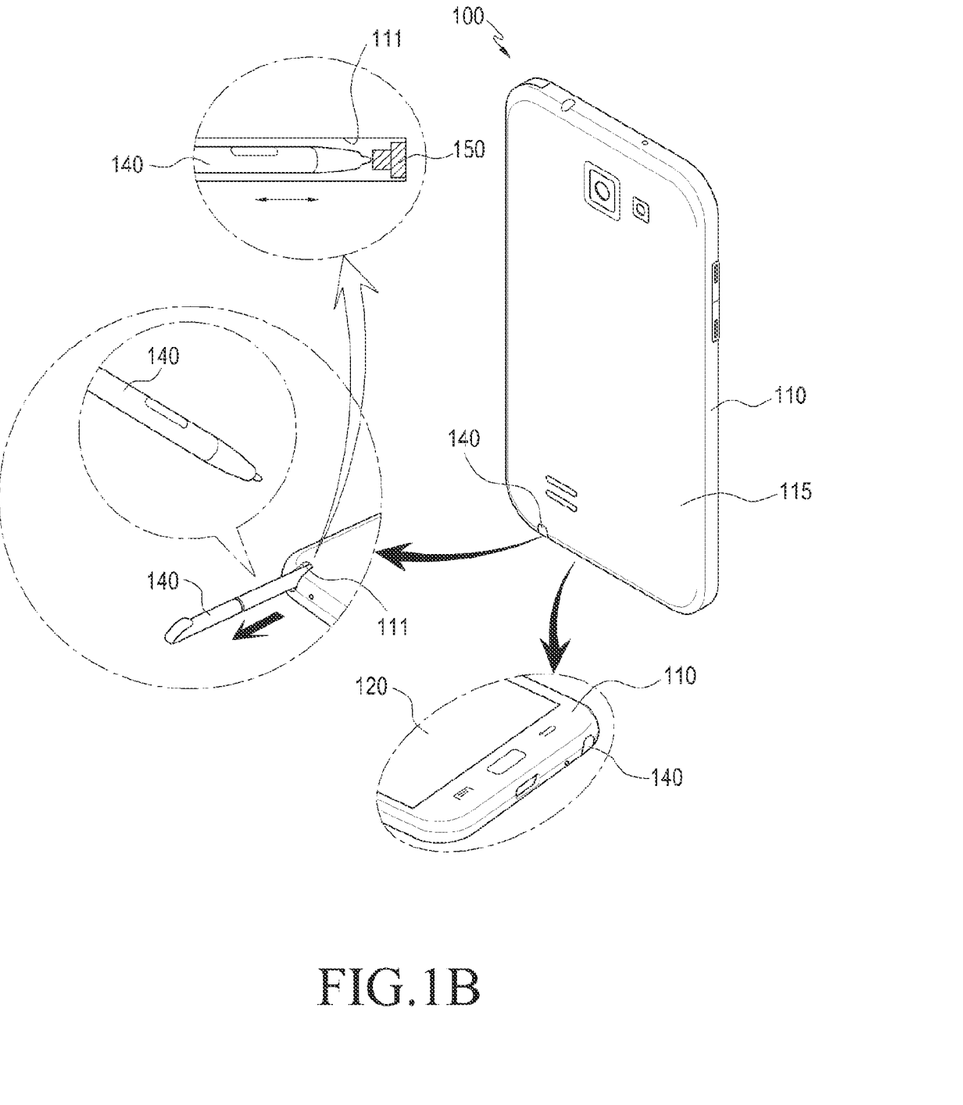

FIGS. 1A and 1B are perspective views schematically illustrating a portable terminal according to embodiments of the present invention. Referring to FIGS. 1A and 1B, a device 10 according to embodiments of the present invention includes a portable terminal 100 and a cover device 200 covering a main body 110 of the portable terminal 100 (see FIG. 2). The portable terminal 100 includes the main body 110, and the main body 110 is provided with various modules such as a communication module, a multimedia module, a camera module, an acoustic module, a sensor module, and the like, according to functions or a structure of the portable terminal. In one embodiment of the present invention, the portable terminal 100 includes a bar type main body 110, a large-sized input/output unit 120 on a front surface of the main body 110, an input member 140 implementing an input according to contact with the input/output unit 120, sensor modules 130 and 150, and a controller 170 (see FIG. 4) controlling the aforementioned configurations, and in addition, is provided with a camera module mounted on front and rear surfaces of the main body 110, a button module having a power function, a volume function, and a special function, and a connector module enabling a connection with an external device. The portable terminal 100 further includes a transmission/reception module.

Figure 4:
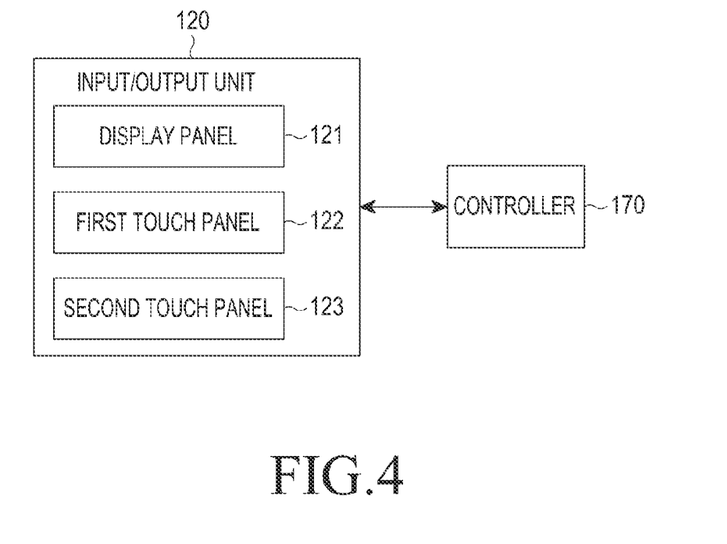
FIG. 4 is a block diagram illustrating a control state of a touch panel in the portable terminal illustrated in FIG. 1.

As mentioned above, the main body 110 is provided with the input/output unit 120, the input member 140, the sensor module (e.g., the sensor module including a first sensor 130 and a second sensor 150), and the controller 170. The input/output unit 120 is provided on the front surface of the main body 110, and receives an input corresponding to contact or proximity of an object to implement an output on a screen. Namely, the input/output unit 120 refers to a device that may display an input and an output according to the input, and includes a touch screen. The input/output unit 120 includes a display panel 121 and touch panels 122 and 123, as shown in FIG. 4.

The display panel 121 may be implemented as a Liquid Crystal Display (LCD) or an Active Matrix Organic Light Emitting Diodes (AMOLED), and displays various images according to various operations implemented in the portable terminal 100, execution of applications, and services.

In the embodiment of the present invention, the touch panels 122 and 123 may include a first touch panel 122 using a capacitive sensing technique and a second touch panel 123 using an Electro-Magnetic Resonance (EMR) sensing technique. The first touch panel 122 is a capacitive touch panel, and is stacked on a bottom surface of the display panel 121. The first touch panel 122 is a dielectric coated panel such as an Indium Tin Oxide (ITO) panel in which a thin metal conductive material, for example, an ITO, is coated on opposite surfaces of glass so that currents may flow and electric charges may be stored on the surfaces of the glass. When an object makes contact with the display panel 121, a predetermined amount of electric charge moves to a contact position of the first touch panel 122 by static electricity. The first touch panel 122 detects the touch position by recognizing a change of the electric current depending on the movement of the electric charges. The first touch panel 122 may detect all touches capable of causing static electricity, and may accordingly detect contact by a user's hand or the input member 140 such as a stylus pen.

The second touch panel 123 is stacked on the bottom surface of the display panel 121, and detects contact of the input member 140 while interworking with the input member 140 as described below. The second touch panel 123 is an Electro Magnetic Resonance (EMR) type touch panel, and includes an electromagnetic induction coil sensor having a grid structure in which a plurality of loop coils are arranged in a first direction determined in advance and a second direction intersecting with the first direction, and an electromagnetic signal processor that sequentially provides alternating current signals, which have a predetermined frequency, to each loop coil of the electromagnetic induction coil sensor.

The second touch panel 123 is operable with the separate input member 140 having therein a resonance circuit capable of generating electric current based on electromagnetic induction. That is, when the input member 140 having the resonance circuit therein is located near the loop coil of the second touch panel 123, a magnetic field transmitted from the corresponding loop coil generates electric current in the resonance circuit of the input member 140 based on mutual electromagnetic induction. Based on the electric current, a coil configuring the resonance circuit in the input member 140 generates an induction magnetic field, and the second touch panel 123 detects the induction magnetic field through the loop coil in a signal receiving state to thereby sense a proximity position or a touch position of the input member 140.

The input member 140 according to the embodiment of the present invention is detachably provided to the main body 110 for convenience. Namely, the main body 110 is provided on one side of a lower end thereof with a mounting unit 111 into which the input member 140 is inserted, and the input member 140 is attached to or detached from the mounting unit 111. As described above, the input member 140 is a tool that interworks with the second touch panel 122, and the second touch panel detects contact by the input member 140.

Although the input/output unit 120 is provided with two touch panels 122 and 123, specifically, the first touch panel 122 and the second touch panel 123 for implementation of an input in the embodiment of the present invention, the input/output unit 120 may also be implemented with just the second touch panel 123 and the display panel 121. Further, although the capacitive touch panel has been described as an example of the first touch panel 122, the first touch panel 122 is not limited thereto and may be implemented using other touch panel types such as a resistive type, an acoustic wave type, and the like. Moreover, although the EMR type touch panel has been described as an example of the second touch panel 123, it is natural that any type of panel capable of responding to contact or proximity of the input member 140 while interworking with the input member 140 may be substituted for the second touch panel 123.

Figure 3:
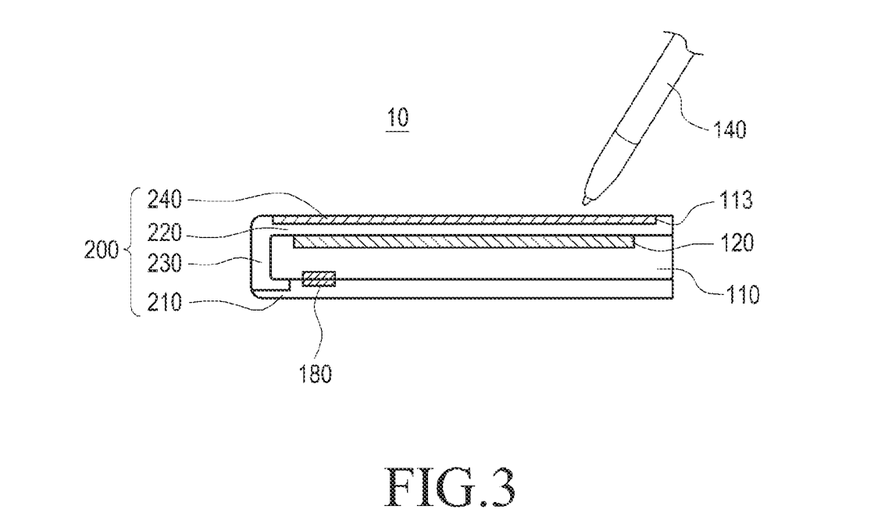
FIG. 3 is a sectional view taken along a line A-A' in FIG. 2A.

Furthermore, although the touch panels 122 and 123 detect the hand of the user and the input member 140 as described above, the touch panels 122 and 123 are not limited thereto. Namely, although specific contents will be described below, the touch panels 122 and 123 are basically deactivated while the cover 200 is folded, and are activated when the cover 200 is open. Furthermore, at least one touch panel, specifically, the second touch panel 123, is activated to detect an input of the input member 140 when use of the input member 140 is activated even while the cover 200 is folded. Accordingly, while the cover 200 covers the input/output unit 120, the touch panels 122 and 123 may detect an input of the input member 140, and may output the detection value depending on the input through an output unit 240, which overlays the input/output unit 120, as shown in FIG. 3. Therefore, it is natural that any configuration capable of implementing the input in response to the input of the input member 140 as described above may be used as the touch panels 122 and 123, and the type or the number thereof may be changed or modified without any specific limitation.

As described above, the input/output unit 120 detects and outputs the input of the user's hand or the input member 140, and includes the first and second touch panels 122 and 123 detecting the input and the display panel 121 displaying the screen according to the input. The input member 140 of the present invention may be implemented to interwork with the touch panel, in particular, the aforementioned second touch panel 123 as briefly mentioned above. The input member 140 may be provided separately from the main body 100, or may also be detachably provided to the main body 110 for convenience. The input member 140 detachably provided to the main body 110 is shown herein. Furthermore, in regard to usage of the input member 140, the main body 110 is provided with a module for detecting activation of the input member 140 in either case where the input member 140 is detachably or separately provided to the main body. It will be described in the embodiment of the present invention that the second sensor 150 is provided.

The mounting unit 111 into which the input member 140 may be detachably inserted is provided on one side of a lower end of the main body. The mounting unit 111 is provided with the second sensor 150, which detects attachment/detachment of the input member 140. The second sensor 150 may be formed in a button type or a switch type, and detects a state in which the input member 140 is inserted into and fixed to the mounting member 111, or a state in which the input member 140 is separated from the mounting member 111. For example, when the second sensor 150 is formed in the button type as in the embodiment of the present invention, the second sensor 150 may be provided on an inner-side end of the mounting unit 111. When the input member 140 is inserted into the mounting unit 111, the second sensor 150 is pressed by a tip end of the input member 140 and thus, detects that the input member 140 is mounted to the mounting unit 111. The controller 170 controls activation of the second touch panel 123 according to the detected signal value of the second sensor 150 detecting whether the input member 140 is attached to or detached from the mounting unit 111. Namely, when the input member 140 is separated from the mounting unit 111, the second touch panel 123 is activated and enters a standby mode to receive a contact signal of the input member 140. Specifically, when the input member 140 performs an input operation on the activated second touch panel 123, the second touch panel 123 detects the input signal of the input member 140. However, the second touch panel 123 detects only contact of the input member 140 and therefore, driving of the second touch panel 123 may be changed. For example, the second touch panel 123 may always be in the standby mode. Otherwise, the second touch panel 123 may be activated according to the usability of the input member 140, namely, it may change to the standby mode in which the second touch panel 123 may be driven through power supplied when the usability of the input member 140 is detected.

Furthermore, when the input member 140 is inserted into and mounted to the mounting unit 111, the second touch panel 123 is deactivated and enters a sleep mode. Thus, the second touch panel 123 does not detect the input signal even though a signal is generated in the input/output unit 120 or in the output unit 240 while the input/output unit 120 is covered by the cover 200.

Figure 2A:
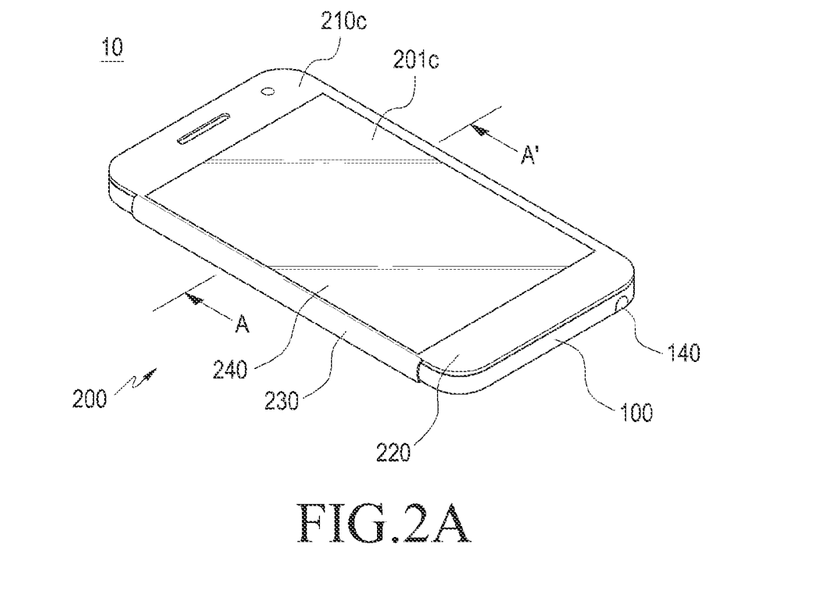
FIGS. 2A and 2B illustrate a state in which a cover device is mounted to the portable terminal illustrated in FIG. 1.
Figure 2B:
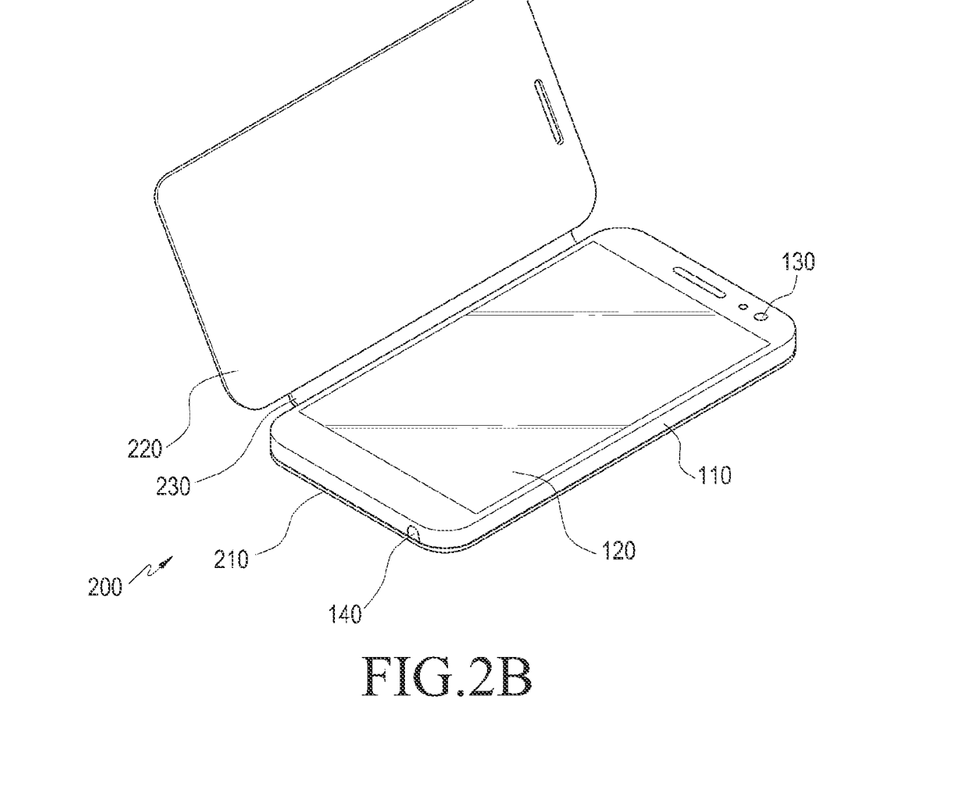

FIGS. 2A and 2B illustrate a state in which a cover device is mounted to the portable terminal illustrated in FIG. 1, and FIG. 3 is a sectional view taken along a line A-A' in FIG. 2A. Referring to FIGS. 2 and 3, a cover 200 may be attached to and detached from the main body 110, and opens/closes the input/output unit 120. The cover 200 is provided on a front surface thereof with an output unit 240 that can display a screen containing contents. The cover 200 having a flip cover form will be described in the embodiment of the present invention.

Furthermore, the cover 200 and the main body 110 may be provided with connectors 180, respectively, such that power is applied to the output unit 240 and the cover 200 is electrically connected with the main body 110 when the cover 200 is secured to the main body 110. For example, when a rear cover 210 is mounted to the main body 110 while the connectors 180 are provided on an inner surface of the rear cover 210 and a rear surface of the main body 110, respectively, the connectors 180 are in contact to be electrically connected with each other.

The cover 200 according to the embodiment of the present invention is a flip type cover including a front cover 220, a rear cover 210, and a connecting member 230. The front cover 220 is rotatably mounted to the rear cover 210, and opens/closes the input/output unit 120 on the front surface of the main body 110. The front cover 220 is provided on the front surface thereof with the output unit 240, and is provided on an inner surface thereof with a soft material such as a fabric so that scratches on the display panel 121 may be prevented when the front cover 220 faces the display panel 121 of the input/output unit 120.

The connecting member 230 rotatably connects the front cover 220 with the rear cover 210. Although the connecting member 230 is occasionally provided in a hinge structure, the connecting member 230 is obtained by softening the material of the front cover 220 and connecting with the front cover 220 in the present invention.

Figure 9A:
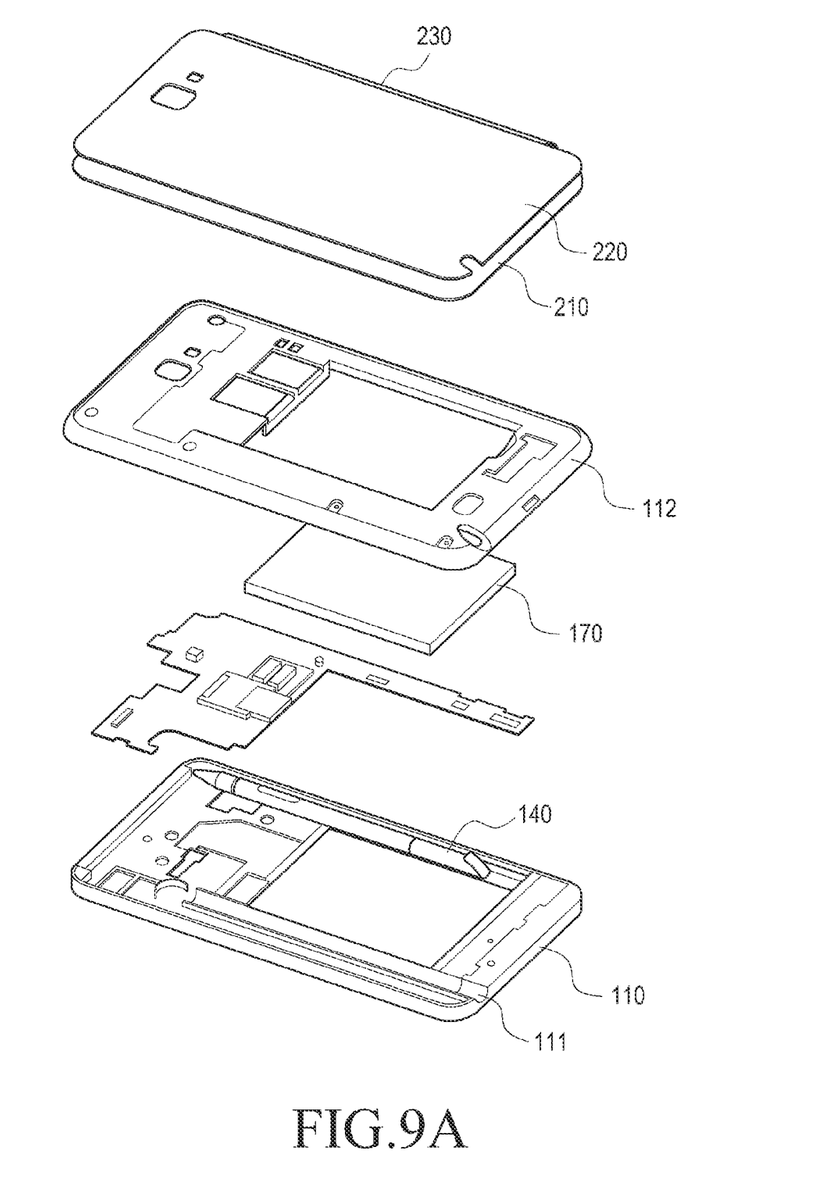
FIG. 9A illustrates a state in which a cover device is mounted to one piece on the main body in the terminal device according to embodiments of the present invention.

FIG. 9A illustrates a state in which a cover device is mounted to one piece on a main body in a terminal device according to embodiments of the present invention.

Figure 9B:
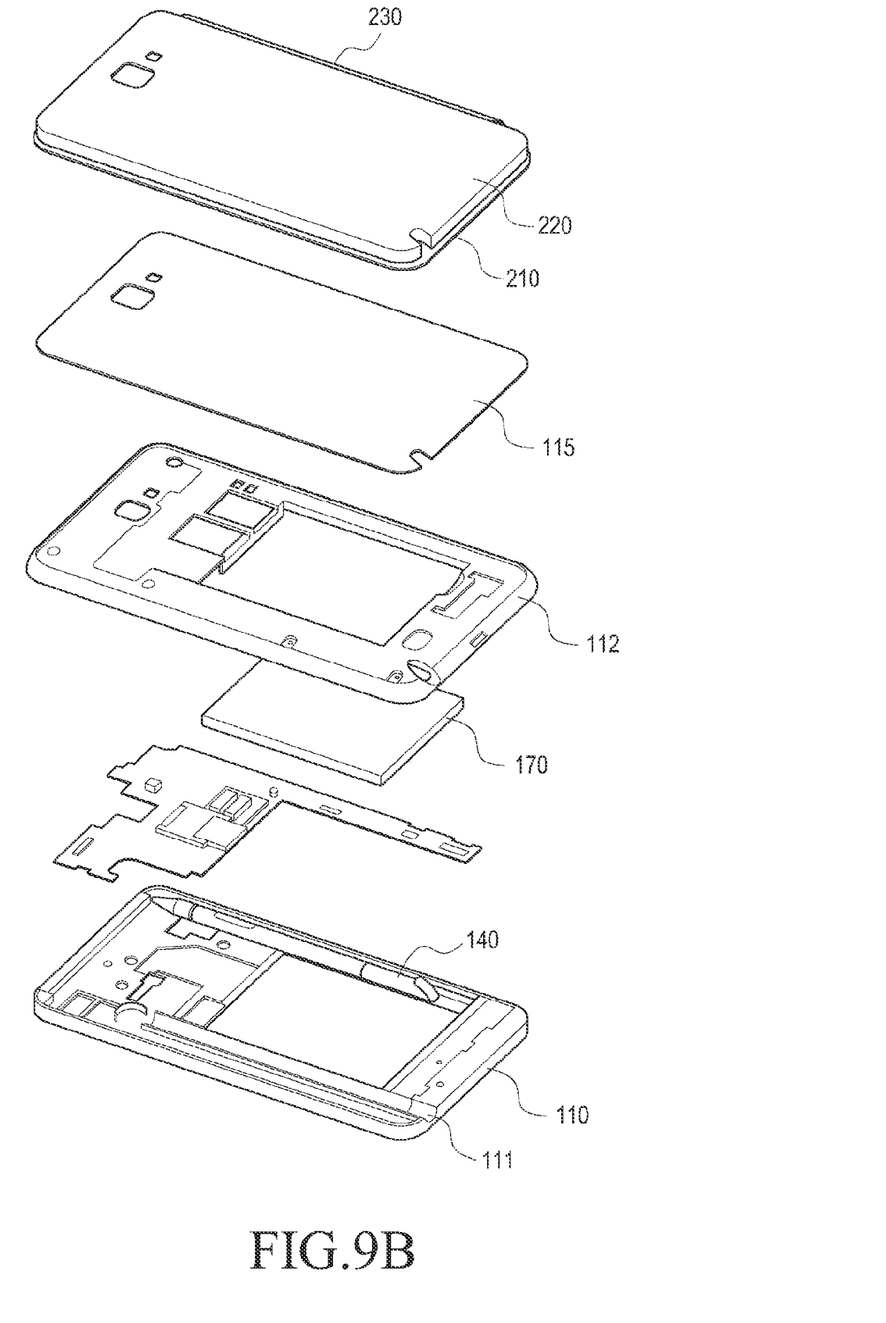
FIG. 9B illustrates a state in which a rear case is mounted to a main body and a cover device covers with the rear case in a terminal device according to embodiments of the present invention.

FIG. 9B illustrates a state in which a rear case is mounted to a main body and a cover device covers the rear case in a terminal device according to embodiments of the present invention.

Referring to FIGS. 9A and 9B, the rear cover 210 is detachably provided on the rear surface of the main body 110, and covers the rear surface of the main body 110. The flip cover of the present invention may be divided into two types depending on the form of the rear cover 210. One is a flip cover forming one body together with the main body 110, and the other is a flip cover configured to be attached to and detached from the main body 110 as a separate form. Here, the term "one body" means that the cover 200 is coupled to the main body to configure the main body as an end product, that is, the main body 110 is configured as one complete end product only when the cover 200, specifically, the rear cover 210 of the cover 200 is provided to the main body 110. Namely, since the main body 110 is not formed as one complete end product if the rear cover 210 is not coupled to the main body 110, it is said that the rear cover 210 is formed integrally with the main body 110. In other words, it means that the cover 200, specifically, the rear cover 210 is provided as a part of the main body 110 to serve as a component of the main body 110. Further, the term "separate form" means that the main body 110 alone forms one complete end product even if the cover 200 is not provided to the main body 110, and therefore, the rear cover 210 is not one component of the main body 110 which is an end product but a separate object. In other words, it means that the cover 200 is individually mounted to the main body 110 which is the one complete end product.

Specifically, the main body 110 is provided on the rear surface thereof with a battery 170 mounting space for mounting a battery 170 and a rear bracket 112 coupled to the rear surface of the main body 110. As described above, when the rear cover 210 is provided as one body together with the main body 110, the rear cover 210 is attached to the main body 110 to cover the rear bracket 112 of the main body 110, thus serving as one component of the main body 110, namely, a rear case of the main body 110. In this case, a thickness is made slimmer as compared with a device 10 in which the cover 200 is individually provided to the main body 110, and a luxurious and appealing design can be provided. The front cover 220 rotates about the rear cover 210, which is provided as one body together with the main body 110, by the connecting member 230 to open/close the input/output unit 120.

When the rear cover 210 is individually provided to the main body 110, the rear case 115 (see FIG. 1B) covering the rear bracket is provided as one body together with the main body 110, and in this state, the rear cover 210 is attached to the rear surface of the main body 110. Namely, the rear cover 210 covers the rear case 115, and is attached to the rear surface of the main body 110. The front cover 220 rotates about the rear cover 210, which is individually provided to the main body 110, by the connecting member 230 to open/close the input/output unit 120.

As described above, the output unit 240 is provided on the front surface of the front cover 220, specifically, a surface exposed to the outside while the front cover 220 is folded toward the input/output unit 120. The output unit 240 may be provided to fit into a recess 113 formed on the front cover 220.

When the cover 200 is fastened to the main body 110, the cover 200 is electrically connected with the main body 110 through the connector 180, power is supplied to the output unit 240 such that contents may be output through the output unit 240, and an output to the output unit 240 can be made according to an input signal applied to the second touch panel 123 while the cover 200 is folded.

As described above, the main body 110 includes the sensor module and the controller 170. The sensor module includes the first sensor 130 which can detect a folding state of the cover 200, and the second sensor 150 which can detect whether the input member 140 is activated (see FIGS. 1B and 3).

The first sensor 130 is located on the front surface of the main body 110, specifically, at the periphery of the input/output unit 120 to prevent interference with the input/output unit 120. The first sensor 130 detects whether the cover 200, specifically, the front cover 220 is folded. In the embodiment of the present invention the first sensor 130 is provided on an upper right corner side of the front surface of the main body 110. Further, the first sensor 130 includes a proximity sensor to detect whether the front cover 220 is folded toward the front surface of the main body 110. However, the installation position or the type of first sensor 130 is not limited thereto. Namely, the first sensor 130 may be installed at any position capable of detecting the folding state of the front cover 220, and if the first sensor 130 detects whether the front cover 220 is folded toward the main body 110, the type of first sensor 130 may be changed without any specific limitation.

The second sensor 150 detects whether the input member 140 is activated, namely, whether the input member 140 is in an activated state or a deactivated state. As described above, in the embodiment of the present invention, the input member 140 is detachably provided to the mounting unit 111 which is provided on one side of the lower end of the main body 110, and the second sensor 150 may be provided to determine the usability of the input member 140 when the input member 140 is attached to or detached from the mounting unit 111. When the input member 140 is positioned in the mounting unit 111, an input to the second touch panel 123 through the input member 140 is not implemented. Thus, in this case, the second sensor 150 detects that the input member 140 is in the deactivated state. Furthermore, when the input member 140 is separated from the mounting unit 111, the input to the second touch panel 123 through the input member 140 may be implemented. Thus, in this case, the sensor unit 150 detects that the input member 140 is in the activated state.

Figure 5:
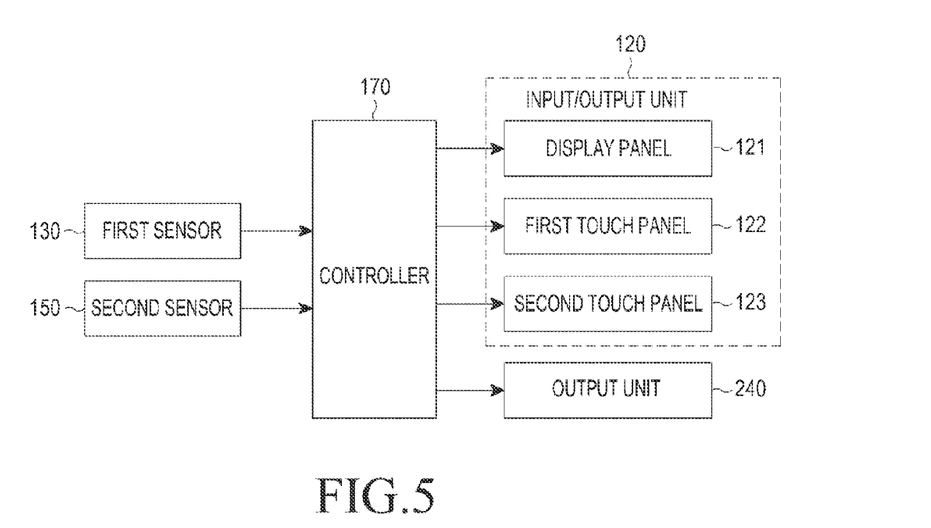
FIG. 5 is a block diagram illustrating a control state of a controller according to signal detection of the sensor in the device illustrated in FIG. 3.

FIG. 4 is a block diagram illustrating a control state of a touch panel in the portable terminal illustrated in FIG. 1, and FIG. 5 is a block diagram illustrating a control state of a controller according to signal detection of the sensor in the device illustrated in FIG. 3. Referring to FIGS. 4 and 5, the controller 170 controls various modules provided to the main body 110, and in particular, is provided to execute the input/output unit 120 and the output unit 240 according to a detection signal of a sensor module in accordance with the present invention. For example, the controller 170 controls a mobile communication module, a sub-communication module, a multimedia module, and the like, which are not illustrated, as well as the input/output unit 120 and the output unit 240 which have been described as an embodiment of the present invention.

Namely, the controller 170 performs a control such that the mobile communication module transmitting/receiving wireless signals for a voice call, a video call, a text message, or a multimedia message through the portable terminal 100 is connected with an external device through mobile communication using one antenna or a plurality of antennas which are provided to the main body 110. Furthermore, in the sub-communication module including at least one of a short range communication module such as a Bluetooth or infrared communication module and a wireless Local Area Network (LAN) module, the controller 170 performs a control such that the portable terminal 100 may be connected with the Internet, for example, at a place where a wireless Access Point (AP) is installed.

In particular, the controller 170 according to an embodiment of the present invention controls driving of the input/output unit 120 and the output unit 240 according to a detected value of the sensor module.

Specifically, the input/output unit 120 and the output unit 240 provide a user with a user interface corresponding to various services including a call service, a data transmission service, a broadcast service, and a photography service. As described above, the input/output unit 120 receives at least one contact input through various objects, for example, a user's body (e.g., fingers) and a contactable input means, for example, the input member 140 such as an electronic pen (stylus pen). Furthermore, the input/output unit 120 may receive a continuous motion of one touch among one or more touches. In the embodiment of the present invention, the contact is not limited to direct contact between a user's body or the input member 140 and the input/output unit 120, and may include non-contact such as a hover. Moreover, the detectable interval of the input/output unit 120 may vary depending on a capability or structure of the device 10.

Fundamentally, the output unit 240 is not a configuration for detecting an input according to contact but a configuration for outputting contents such as a time, a date, the number of calls, the number of transmissions or messages, the number of mobile communications such as transmission, whether transmission occurs, and application related displays. Furthermore, when the second panel 123 is activated according to detection of the first and second sensors 130 and 150, if an input of the input member 140 is implemented on the output unit 240, an output value according to the input is output through the output unit 240 by the second touch panel 123 having detected the input.

Thus, the input/output unit 120 and the output unit 240 may be driven or may not be driven according to the detected values of the first and second sensors 130 and 150 which are applied to the controller 170. Specifically, when the first sensor 130 detects a signal and the second sensor 150 does not detect a signal, the device 10 is in a state in which the front cover 220 is folded toward the front surface of the main body 110 and the input member 140 is inserted into the mounting unit 111 to be deactivated. The main body 110 is not used but is implemented in a sleep mode in which the main body 110 may be driven at anytime. Thus, the input/output unit 120 is in a turned-off state, and the output unit is in a turned-on state and is supplied with power. Specifically, the first and second touch panels 122 and 123 and the display panel 121 are turned off, and the output unit 240 is turned on. Furthermore, the exposed output unit 240 on the front surface of the front cover 220 outputs not only simple contents such as time and weather but also icons of contents such as the number of calls or messages, whether transmission occurs, identification of transmission, and execution of a social network application. Further, a user may utilize various functions through the output unit 240 even in the state in which the cover covers the main body, by implementing, through the output unit, an output of an e-book or an output of an operation according to a multimedia module, e.g., a video.

In the state in which the first sensor 130 detects the signal and the second sensor 150 does not detect the signal, when the input member 140 is separated from the mounting unit 111, the second sensor 150 detects a signal. In other words, the second sensor 150 also detects the signal while the first sensor 130 detects the signal. Although the controller 170 has controlled the input/output unit 120 to be turned off and the output unit 240 to be turned on according to the detection of the signal by the first sensor 130 and undetection of the signal by the second sensor 150, the controller 170 controls such that only the second touch panel 123 among the input/output unit 120 in the turned-off state may be driven, since the second sensor 150 detects the signal. Namely, the output unit 240 is maintained in the turned-on state, and only the second touch panel 123 among the input/output unit 120 in the turned-off state is supplied with power and is in a standby state in which the second touch panel 123 may be driven. In other words, the second touch panel 123 is in the turned-on state to detect an input motion of the input member 140, and the first touch panel 122 and the display panel 121 are maintained in the turned-off state as before.

Driving of the device 10 in the state in which the output unit 240 and the second touch panel 123 are turned on will be described below. Describing the device 10 in the above-described state, the front cover 220 has been folded toward the input/output unit 120 of the main body 110. Furthermore, the output unit 240 has been supplied with power to display the contents, the input member 140 has been activated for use, and the second touch panel 123 has been supplied with power. When a user makes contact with icons or contents displayed on the output unit 240 through the input member 140, the contact of the input member 140 is detected by the second touch panel 123. The controller 170 controls such that the detected value by the second touch panel 123 is output through the output unit 240. Namely, although the output unit 240 provided to the front cover 220 is not provided with a separate module such as the touch panel for detecting the input of the input member 140, the output according to the input of the input member 140 may be implemented on the output unit 240 provided to the cover 200, by using the second touch panel 123 provided to the main body 110.

FIGS. 6A to 6E illustrate various embodiments depending on an output of the output unit and usability of the input member in the embodiment illustrated in FIG. 3.

Figure 6A:
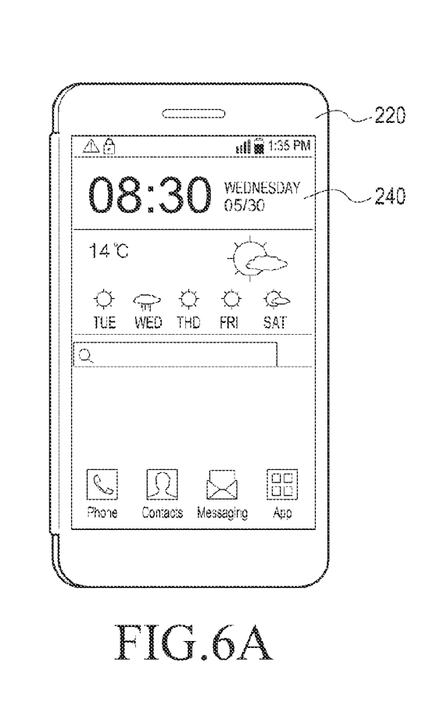
FIGS. 6A to 6E illustrate various embodiments of the present invention depending on an output of the output unit and usability of the input member in the embodiment illustrated in FIG. 3.

For example, as illustrated in FIG. 6A, the output unit 240 provides a user with convenience, and outputs a simple state, namely, weather, time, and the like, or user icons required by the user in using the device 10, while the input member 140 is deactivated and the front cover 220 covers the front surface of the main body 110.

Figure 6B:
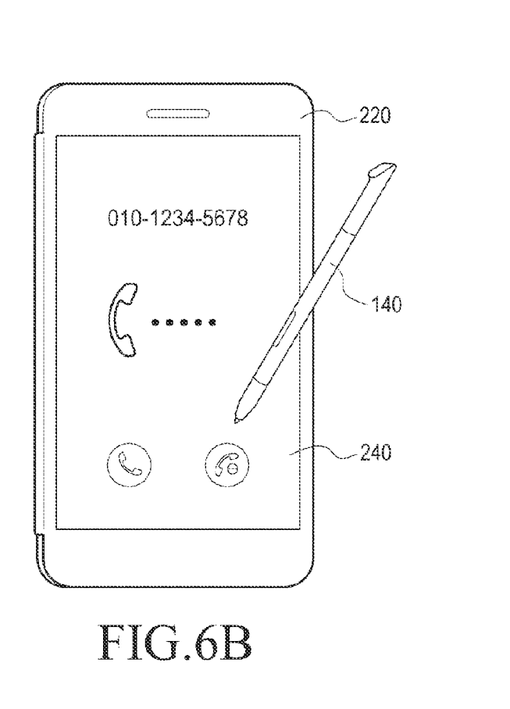

Furthermore, as illustrated in FIG. 6B, when a call is received while the front cover 220 covers the front surface of the main body 110, the output unit 240 outputs sender information. If a user makes contact with an icon for call reception on the output unit 240 by using the input member 140, the second touch panel 123 detects the contact and the main body 110 is accordingly driven in a call reception state.

Figure 6C:
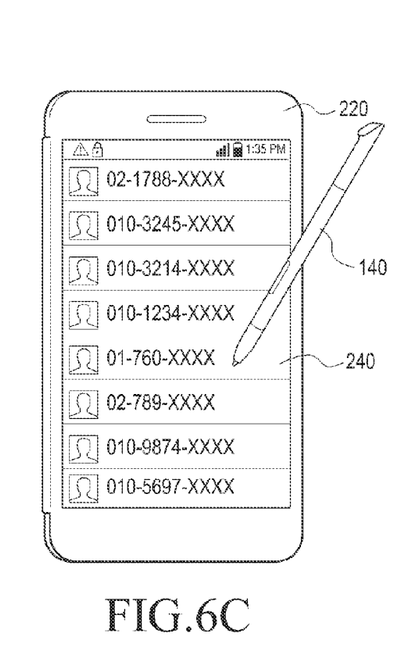

Moreover, as illustrated in FIG. 6C, identification of a contact point or a received call list, or an outgoing call can also be made in addition to the call reception. For example, when a user wants to view a recent call list which includes phone numbers, the user makes contact with a call related icon output on the output unit 240 by using the input member 140. The detection value of the second touch panel 123 having detected the contact of the input member 140 is recognized by the controller 170, and the controller 170 controls the output unit 240 to output an operation according to the input of the input member 140. Furthermore, if the input member 140 contacts one of the output phone numbers, the second touch panel 123 detects the contact, and the controller 170 may make an output for the detected contact, for example, by making an outgoing call, or may identify setting information of the user.

Figure 6D:
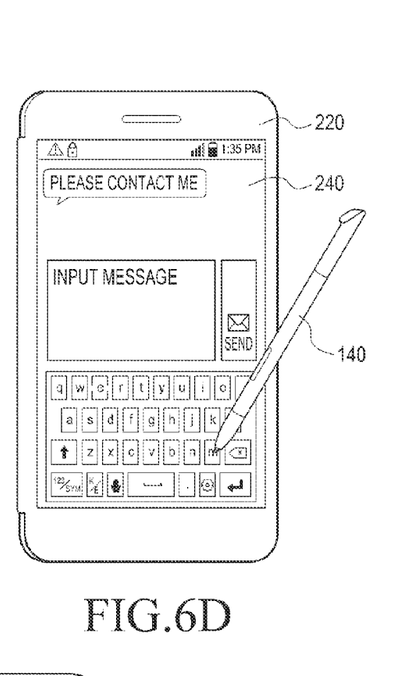

In addition, as illustrated in FIG. 6D, when a message is received, contents of the message may be identified through the output unit 240. If the contents of the message are long, the user moves the message output on the output unit 240 upward and downward using the input member 140. The second touch panel 123 detects the contact of the input member 140, and the controller 170 controls such that the operation according to the input of the input member 140 is output to the output unit 240 depending on the detected value of the second touch panel 123. Furthermore, a message can be made and transmitted according to implementing the input of the input member 140 through the output unit 240. Namely, if the input member 140 contacts buttons on the output unit 240 for an input of a message while a message window for message reception and input buttons are output to the output unit 240, the second touch panel 123 detects the contact. The detected value by the second touch panel 123 is recognized by the controller 170. The controller 170 controls such that an output to the output unit 240 is implemented depending on the detected value by the second touch panel 123, thereby enabling input and transmission of a message.

Figure 6E:
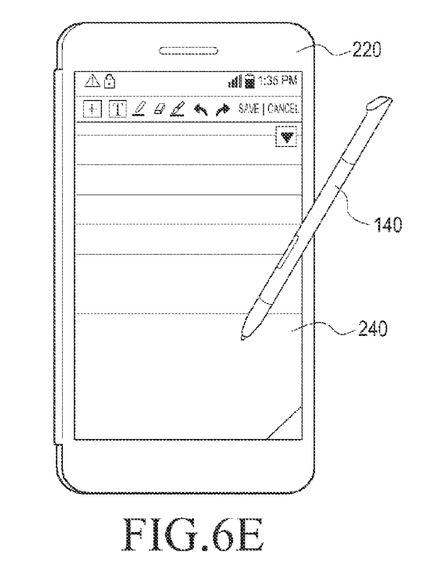

As illustrated in FIG. 6E, the user may also execute an electronic note icon or an electronic book icon. Namely, if the input member 140 contacts the memo icon or the electronic book icon output on the output unit 240, the second touch panel 123 detects the contact by the input member 140 and the detected value is applied to the controller 170. The controller 170 controls such that the memo or the electronic book is output to the output unit 240 by the applied value. In addition, the user may implement operations such as writing or revising contents in the memo output on the output unit 240 or flipping the page of an electronic book by contacting the input member 140 with the output unit 240.

When the input member 140 contacts an output portion of the output unit 240 according to the embodiment of the present invention, the second touch panel 123 provided to the main body 110 recognizes the contact, and the controller 170 controls such that an operation according to the input of the input member 140 is output to the output unit 240, so that various embodiments can be made in addition to the aforementioned embodiments. Namely, the second touch panel 123 mounted to the main body 110 detects the contact of the input member 140, and the controller 170 outputs the operation depending on the detected value of the second touch panel 123 through the output unit 240. Accordingly, the controller 170 may output, through the output unit 240, various operations for the detection value by the contact between the input member 140 and the second touch panel 123 according to the set user environment.

That is, the output unit 240 has only to implement the output, and the preset value depending on the contact of the input member 140 may be output to the output unit 240 according to the activation of the input member 140 and the second touch panel 123.

Figure 7:
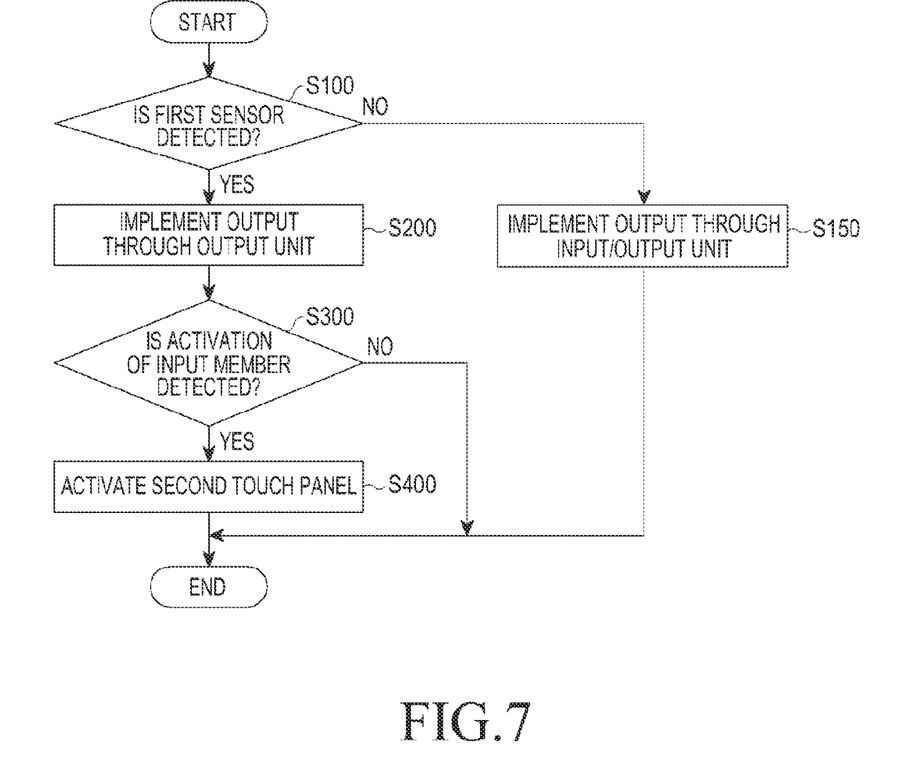
FIG. 7 is a flowchart illustrating driving of the device according to the embodiment illustrated in FIG. 3.
Figure 8:
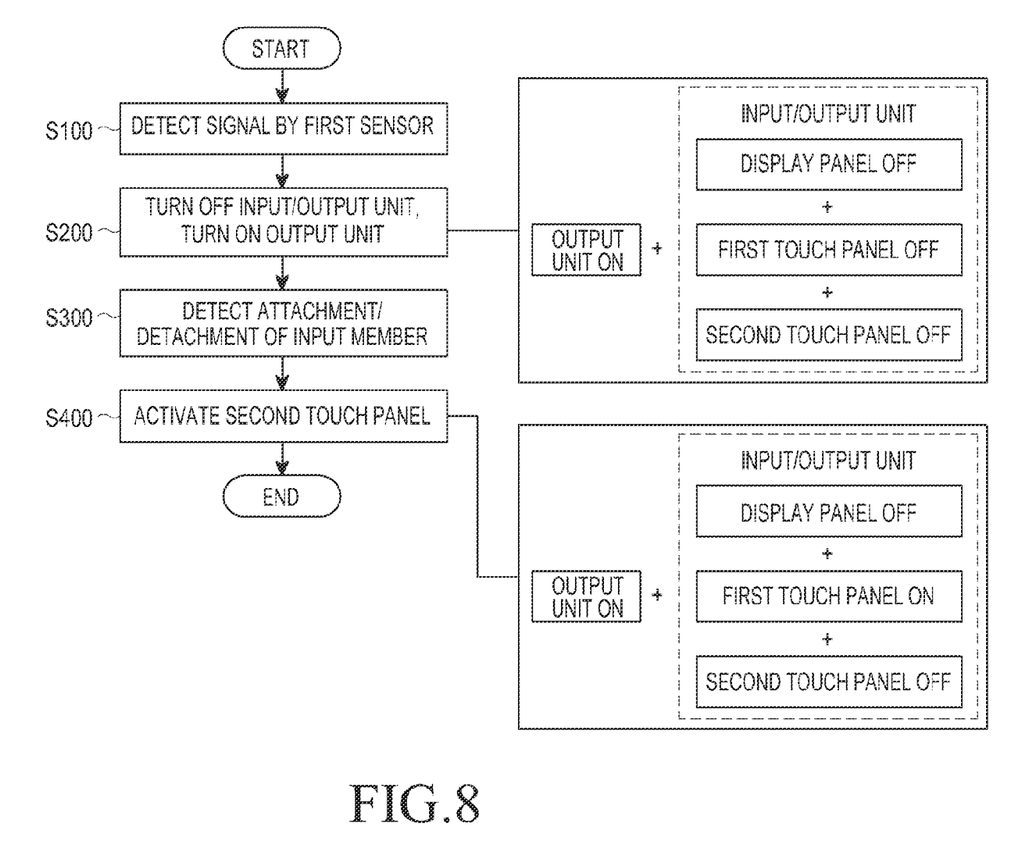
FIG. 8 is a flowchart schematically illustrating driving of the device according to detection signals of the first and second sensors in the device according to the embodiment illustrated in FIG. 3.

FIG. 7 is a flowchart illustrating driving of the device according to the embodiment illustrated in FIG. 3, and FIG. 8 is a flowchart schematically illustrating driving of the device according to detection signals of the first and second sensors in the device according to the embodiment illustrated in FIG. 3. The driving of the device 10 having the above-described configurations will be described below with reference to FIGS. 7 and 8.

When the cover 200 is fastened to the main body 110 of the terminal 100 integrally or as an individual configuration, the connectors 180 are engaged and electrically connected with each other. Namely, the rear cover 210 is fastened to the rear surface of the main body 110 to thereby form the rear case, or is secured to the main body 110 while covering the rear case of the main body 110. Accordingly, power may be applied to the output unit 240, and the controller 170 controls the output unit 240 to be turned on/off.

The first sensor 130 disposed on the upper right side of the main body 110 detects a signal according to a folding state of the front cover 110, in step S100.

When the first sensor 130 does not detect a sensing value, it is determined that the front cover 220 has been unfolded away from the front surface of the main body 110, and the controller 170 controls the input/output unit 120 to be turned on such that an output through the input/output unit 120 is implemented and controls the output unit 240 to be turned off, in step S150.

Accordingly, a user drives various functions of the portable terminal 100 by the input and output through the input/output unit 120. Furthermore, usability of the device 10 such as in a sleep mode, a standby mode, or a driving mode may be determined according to whether the power button provided to the main body 110 is contacted. Specifically, when power is applied to the device 10 through pressing the power button for using at least one of a communication function, a multimedia function, an application function, and the like, the main body 110 is driven in the standby mode or in the driving mode. In particular, the first touch panel 122 and the display panel 121 are supplied with power to operate according to the standby mode or the driving mode. Namely, the first touch panel 122 is turned on and the display panel 121 is turned on. In this state, a user may use various functions through an input by contact of the input/output unit 120 of the terminal 100 or an output according to the input.

On the other hand, when the first sensor 130 detects a signal in step S100, the controller 170 controls the input/output unit 120 to be turned off and the output unit 240 to be turned on, in step S200, so that the output is implemented not through the input/output unit 120 but through the output unit 240 provided on the front surface of the front cover 220

As the input member 140 is detached from the mounting unit 111 in this state, the second sensor 150 detects activation according to use of the input member 140, in step S300.

When the input member 140 is separated from the mounting unit 111, the second sensor 150 detects a signal, and the controller 170 controls the second touch panel 123 to be turned on according to the detection of the second sensor 150, in which the second touch panel 123 responds to the input member 140 among configurations of the turned-off input/output unit 120, in step S400. Namely, the second touch panel 123 is activated to detect the input of the input member 140. When the input member 140 contacts contents output on the output unit 240, for example, a multimedia related icon, the second touch panel 123 detects the contact. The value detected by the second touch panel 123 is applied to the controller 170, and the controller 170 controls the output unit 240 to output an operation according to the contact of the input member 140.

The portable terminal provided with the cover device according to the various embodiments of the present invention may implement the output of the contents through the cover even while the touch screen is covered with the cover so that a user may identify the contents output on the front surface of the cover without opening the cover.

Furthermore, when the input member is detected to be used while the touch screen is covered with the cover, the output depending on the input of the input member can be implemented on the front surface of the cover device. Namely, though the cover device is not provided with a separate device for detecting an input, the output depending on the input of the input member can be implemented on the output unit of the cover when the cover is detected to be folded and the input member is detected to be used.

Moreover, since the touch panel interworking with the input member is activated according to the activation of the input member so that the input can be implemented even while the cover covers the portable terminal, the output unit provided on the cover does not need a separate device such as a touch panel for implementing an input, and thus, a separate configuration for the input is excluded from the cover, thereby preventing an increase in thickness of the cover and achieving price competitiveness.

In addition, a user can identify the contents output on the front surface of the cover without opening the cover, and the cover is prevented from being frequently opened and closed, and thus damage or breakdown thereof can be avoided.

Although embodiments of the present invention are described, various modifications can be implemented without departing from the scope of the present disclosure. For example, the first sensor 130 does not need to be mounted on the upper right side of the main body 110 as mentioned above but may be mounted in any position capable of detecting the folding state of the cover 200, and the second sensor 150 does not need to be mounted in an interior of the mounting unit 111 but may be mounted in any position capable of detecting the usability of the input member 140. Furthermore, although the large-sized output unit 240 is provided on the front surface of the front cover 220 as described herein, the size of the output unit 240 may be diversely modified within the size of the front cover 220 as needed. In this case, the second touch panel 123 is provided to be activated corresponding to the location of the output unit 240, and such a modified embodiment may be carried out without departing from the scope of the present invention.

Accordingly, the scope of the present invention shall not be determined by the above-described embodiments, and is to be determined by the following claims and their equivalents.

What is claimed is:

1. A portable terminal comprising:
    a first display of the portable terminal;
    a first sensor configured to detect whether a cover device, which is detachably coupled to the portable terminal and comprises a second display, covers the first display;
    a plurality of touch panels; and
    a controller configured to operate the portable terminal in one of a first mode and a second mode according to whether the cover device covers the first display,
    wherein, the controller is configured to control, in the first mode, the first display to be turned on and a second display of the cover device to be turned off, and detect a first touch on the first display using the plurality of touch panels of the portable terminal in the first mode,
    wherein, the controller is configured to control, in the second mode, the first display to be turned off, and the second display to be turned on, and detect a second touch on the second display of the cover device using one of the plurality of touch panels of the portable terminal in the second mode, and
    wherein, the controller, in response to detecting that the cover device covers the first display while the portable terminal is operated in the first mode and first information is displayed on the first display, is configured to control the portable terminal to operate in the second mode and control the first information to be displayed on the second display.

2. The portable terminal of claim 1, wherein the a plurality of touch panels comprise:
    a first touch panel configured to detect a touch according to a first sensing type; and
    a second touch panel configured to a detect a touch according to a second sensing type that is different from the first sensing type.

3. The portable terminal of claim 2, further comprising:
    an input member configured to receive a touch according to the second sensing type; and
    the second sensor configured to detect whether the input member is attached to the portable terminal.

4. The portable terminal of claim 3, further comprising a mounting unit which is included in a main body of the portable terminal, wherein the input member is detachably inserted into the mounting unit, and wherein the second sensor is positioned in the mounting unit.

5. The portable terminal of claim 4, wherein the second sensor is positioned in the mounting unit in a main body of the portable terminal.

6. The portable terminal of claim 3, wherein the first touch panel is deactivated in the second mode, and
    wherein the controller is further configured to control the second touch panel to be activated, in response to detecting that the input member is detached from the portable terminal in the second mode.

7. The portable terminal of claim 2, wherein the controller is further configured to control the second touch panel to be activated, in response to detecting that the input member is detached from the portable terminal.

8. The portable terminal of claim 1, wherein the cover device further comprises:
- a rear cover configured to detachably connect on a rear surface of the portable terminal;
- a front cover rotatably coupled to the rear cover and including the second display on a front surface thereof, the front cover configured to cover a front surface of the portable terminal; and
- a connecting member connecting the front cover to the rear cover such that the front cover and the rear cover are rotatable with respect to each other.

* * * * *